US009467613B2

(12) United States Patent
Kadohara et al.

(10) Patent No.: US 9,467,613 B2
(45) Date of Patent: Oct. 11, 2016

(54) FOCUSING APPARATUS AND METHOD OF CONTROLLING FOCUSING APPARATUS

(71) Applicant: CANON KABUSHIKI KAISHA, Tokyo (JP)

(72) Inventors: Terutake Kadohara, Yokohama (JP); Hideya Takanashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 21 days.

(21) Appl. No.: 13/785,730

(22) Filed: Mar. 5, 2013

(65) Prior Publication Data

US 2013/0242173 A1    Sep. 19, 2013

(30) Foreign Application Priority Data

Mar. 16, 2012  (JP) ................................. 2012-061006
Feb. 5, 2013   (JP) ................................. 2013-020847

(51) Int. Cl.
*H04N 5/232*      (2006.01)

(52) U.S. Cl.
CPC ................................ *H04N 5/23212* (2013.01)

(58) Field of Classification Search
CPC ........... H04N 5/2356; H04N 5/23212; H04N 5/235; H04N 5/243
USPC ........ 348/345, 348, 349, 353, 356, 362, 364
See application file for complete search history.

(56) References Cited

U.S. PATENT DOCUMENTS

| 6,710,808 | B1 * | 3/2004 | Yamagishi | 348/362 |
| 2001/0022626 | A1 * | 9/2001 | Nozaki | 348/345 |
| 2005/0174451 | A1 * | 8/2005 | Nozaki et al. | 348/240.99 |
| 2009/0110383 | A1 * | 4/2009 | Fujii | G03B 13/32 396/128 |
| 2009/0185047 | A1 * | 7/2009 | Takachi | 348/222.1 |
| 2011/0109776 | A1 * | 5/2011 | Kawai | 348/273 |
| 2012/0327267 | A1 * | 12/2012 | Takahara | 348/231.99 |

FOREIGN PATENT DOCUMENTS

| JP | 08-265629 | 10/1996 |
| JP | 2013011763 A | * 1/2013 |

* cited by examiner

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

A focusing apparatus includes an image pickup element that includes a plurality of unit cells including a first pixel and a second pixel corresponding to a same microlens, a detector configured to detect a phase difference of an image signal of a first pixel group and an image signal of a second pixel group that correspond to a focus detection region, a focus controller configured to perform a focus control based on a detection result of the detector, an exposure controller configured to control an exposure value based on an output from the image pickup element, the detector detects the phase difference of an image signal generated by sequentially switching a plurality of focus detection regions, and the exposure controller controls the exposure value so as to be fixed until the detector completes a detection of the phase difference in the plurality of focus detection regions.

8 Claims, 13 Drawing Sheets

FOCUSING APPARATUS AND METHOD OF CONTROLLING FOCUSING APPARATUS

BACKGROUND OF THE INVENTION

1. Field of the Invention

The present invention relates to a focusing apparatus that performs focusing a phase difference method.

2. Description of the Related Art

Previously, when an auto-focusing (AF) is performed using an image signal obtained from an image pickup element (an image pickup surface) of an image pickup apparatus, commonly an AF control of a contrast method (TVAF) is performed. In the AF control of the contrast method, since the continuity of AF evaluation values is required, an exposure value during the AF control needs to be fixed (maintained) so as to be a value obtained before starting the AF control. Japanese Patent Laid-Open No. H8-265629 discloses a configuration in which an error determination of an in-focus state caused by the AF evaluation value obtained by the contrast method that is varied in accordance with a state of an exposure is prevented.

However, in the configuration disclosed in Japanese Patent Laid-Open No. H8-265629, the AF evaluation value of the contrast method is affected by an output of an image signal, and the continuity of the AF evaluation values need to be considered. Therefore, Japanese Patent Laid-Open No. H8-265629 focuses on the exposure value which is fixed during the AF control.

On the other hand, an AF control by a phase difference method uses an AF evaluation value based on a shift amount of image signals, and it is preferred that the AE control is appropriately performed in order to obtain an exact AF evaluation value. Therefore, when the AF control is performed by combining the phase difference method and the contrast method or a phase difference detection is performed by switching a plurality of ranging regions by the phase difference method on an image pickup surface, the exposure value needs to be control in accordance with each method.

BRIEF SUMMARY OF THE INVENTION

The present invention provides a focusing apparatus and a method of controlling the focusing apparatus that appropriately control whether an exposure value is fixed or variable in accordance with a condition when focusing is performed using a phase difference method.

A focusing apparatus as one aspect of the present invention includes an image pickup element that includes a plurality of unit cells including a first pixel and a second pixel corresponding to a same microlens, a detector configured to detect a phase difference of an image signal of a first pixel group and an image signal of a second pixel group that correspond to a focus detection region, a focus controller configured to perform a focus control based on a detection result of the detector, an exposure controller configured to control an exposure value based on an output from the image pickup element, the detector detects the phase difference of an image signal generated by sequentially switching a plurality of focus detection regions, and the exposure controller controls the exposure value so as to be fixed until the detector completes a detection of the phase difference in the plurality of focus detection regions.

A focusing apparatus as another aspect of the present invention includes an image pickup element configured to perform a photoelectric conversion of an image formed by a light beam passing through different pupil regions of an image pickup optical system to generate a pair of image signals, a detector configured to detect a phase difference of the pair of image signals generated by the image pickup element, a focus controller configured to perform a focus control based on a detection result of the detector, an exposure controller configured to control an exposure value based on an output from the image pickup element, and a determining unit configured to determine whether the exposure value is controlled to be fixed or variable by the exposure controller in accordance with an operation of the detector.

A method of controlling a focusing apparatus as another aspect of the present invention is a method of controlling a focusing apparatus having an image pickup element that includes a plurality of unit cells including a first pixel and a second pixel corresponding to a same microlens, the method includes a detecting step of detecting a phase difference of an image signal of a first pixel group and an image signal of a second pixel group that correspond to a focus detection region, a focus controlling step of performing a focus control based on a detection result of the detecting step, an exposure controlling step of controlling an exposure value based on an output from the image pickup element, in the detecting step, the phase difference of an image signal generated by sequentially switching a plurality of focus detection regions is detected, and, in the exposure controlling step, the exposure value is controlled so as to be fixed until a detection of the phase difference in the plurality of focus detection regions is completed by the detecting step.

A method of a focusing apparatus as another aspect of the present invention is a method of controlling a focusing apparatus that includes an image pickup element configured to perform a photoelectric conversion of an image formed by a light beam passing through different pupil regions of an image pickup optical system to generate a pair of image signals, the method includes a detecting step of detecting a phase difference of the pair of image signals generated by the image pickup element, a focus controlling step of performing a focus control based on a detection result in the detecting step, an exposure controlling step of controlling an exposure value based on an output from the image pickup element, and a determining step of determining whether the exposure value is controlled to be fixed or variable in the exposure controlling step in accordance with an operation in the detecting step.

Further features and aspects of the present invention will become apparent from the following description of exemplary embodiments with reference to the attached drawings.

DETAILED DESCRIPTION OF THE PREFERRED EMBODIMENTS

Figure 1:
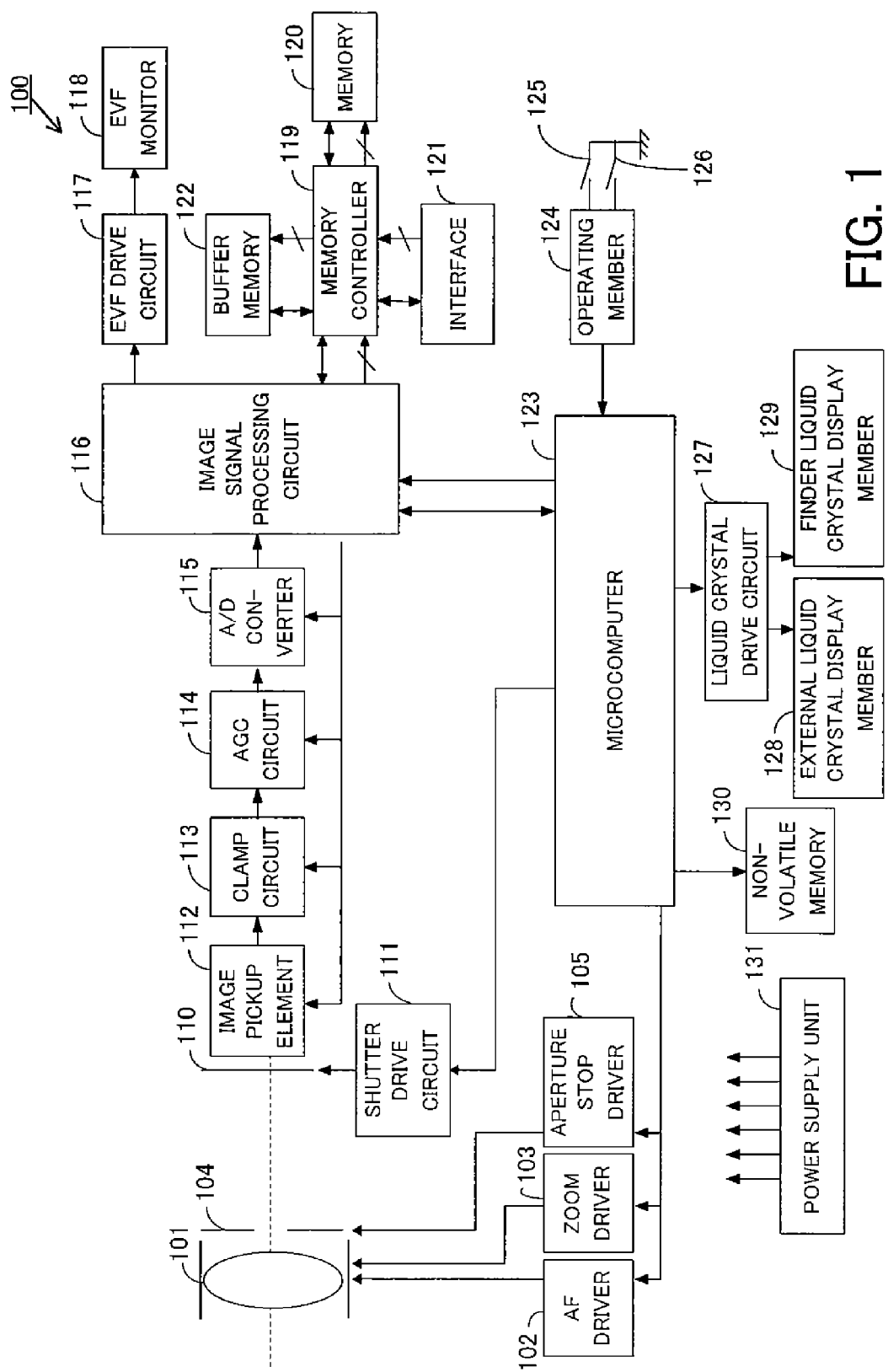
FIG. 1 is a block diagram of an image pickup apparatus in each of embodiments.

Exemplary embodiments of the present invention will be described below with reference to the accompanied drawings. In each of the drawings, the same elements will be denoted by the same reference numerals and the duplicate descriptions thereof will be omitted.

First of all, referring to FIG. 1, a configuration of an image pickup apparatus (a digital camera) including a focusing apparatus in the present embodiment will be described. FIG. 1 is a block diagram of an image pickup apparatus 100 in the present embodiment. In FIG. 1, reference numeral 101 denotes an image pickup lens. Reference numeral 102 denotes an AF (autofocus) driver. The AF driver 102 (a focus controller) is for example configured by a DC motor or a stepping motor, and changes a focus lens position of the image pickup lens 101 based on a control of a microcomputer 123 (a detector) so as to perform a focusing (a focus control).

Reference numeral 103 denotes a zoom driver. The zoom driver 103 is for example configured by a DC motor or a stepping motor. The zoom driver 103 changes a position of a magnification varying lens of the image pickup lens 101 based on the control of the microcomputer 123 so as to change a focal length of the image pickup lens 101. Reference numeral 104 denotes an aperture stop. Reference numeral 105 denotes an aperture stop driver. The aperture stop driver 105 drives the aperture stop 104. A driving amount of the aperture stop 104 is calculated by the microcomputer 123 so as to change an optical aperture value (F-number). Reference numeral 110 denotes a focal plane shutter. Reference numeral 111 denotes a shutter drive circuit, which drives the focal plane shutter 110. An opening time of the shutter is controlled by the microcomputer 123.

Reference numeral 112 denotes an image pickup element. The image pickup element 112 is configured by using a CCD sensor or a CMOS sensor, which performs a photoelectric conversion for an object image that is formed by the image pickup lens 101 so as to generate an electric signal (an analog signal). A brightness of an object (a field) is measured (photometrically measured) based on this electric signal, and each of control values of the aperture stop 104 by the aperture stop driver 105 and the focal plane shutter 110 by the shutter drive circuit 111 is calculated. Thus, the microcomputer 123 also functions as an exposure controller that controls an exposure value (an exposure state) based on a signal that is generated by and outputted from the image pickup element 112.

The image pickup element 112 of the present embodiment is also used as a sensor to perform focus detection, which is capable of performing two focus detection methods of a contrast method (TVAF) and a phase difference detection method. The microcomputer 123 instructs the AF driver 102 based on a focus detection result of each of the contrast method and the phase difference detection method so as to drive the focus lens of the image pickup lens 101. The details will be described below.

Reference numeral 113 denotes a clamp circuit. Reference numeral 114 denotes an AGC circuit. The clamp circuit 113 and the AGC circuit 114 perform a basic analog signal processing before an analog-to-digital (A/D) conversion is performed, and change a clamp level and an AGC reference level based on the instruction from the microcomputer 123. Reference numeral 115 denotes an A/D converter. The A/D converter 115 converts the electric signal (the analog signal) from the image pickup element 112 to a digital signal.

Reference numeral 116 denotes an image signal processing circuit, which is configured by including a logic device such as a gate array. Reference numeral 117 denotes an EVF (electronic view finder) drive circuit, and reference numeral 118 denotes an EVF (electronic view finder) monitor. Reference numeral 119 denotes a memory controller, reference numeral 120 denotes a memory, and reference numeral 121 denotes an external interface that is capable of connecting a computer or the like. Reference numeral 122 denotes a buffer memory, and reference numeral 123 denotes a microcomputer.

The image signal processing circuit 116 performs a compression processing such as JPEG, in addition to a filter processing, a color conversion processing, and a gamma processing, for the digitalized image signal (the digital signal) so as to be outputted as image data to the memory controller 119. The image signal processing circuit 116 outputs the image signal obtained from the image pickup element 112 and the image data reversely inputted from the memory controller 119 to the EVF monitor 118 via the EVF drive circuit 117. The switching of these functions is performed based on the instruction of the microcomputer 123. Furthermore, the image signal processing circuit 116 outputs exposure information of the signal of the image pickup element 112 or information such as a white balance to the microcomputer 123 if needed. Based on the information, the microcomputer 123 performs an instruction of the white balance or a gain adjustment. When a continuous shooting is performed, shot data is temporarily stored as unprocessed images in the buffer memory 122, the unprocessed image data are read via the memory controller 119. Then, the image signal processing circuit 116 performs the image processing and the compression processing so as to perform the continuous shooting. The number of images obtained by the continuous shooting depends on a capacity of the buffer memory 122.

The image signal processing circuit 116 calculates an evaluation value that is used to perform the focus detection. In the contrast method, a contrast calculation value in a predetermined section of the image signal is determined as the evaluation value to be continuously sent to the microcomputer 123. The microcomputer 123 performs an optimal focusing based on a change or a continuity of the evaluation value. On the other hand, in the phase difference detection method, a part of the image signals that is used to obtain an image shift amount that is a phase difference amount is extracted, and a necessary correction or the like is performed for the signals to be sent to the microcomputer 123. In the present embodiment, the image shift amount may also be obtained by the image signal processing circuit 116.

The memory controller 119 stores the unprocessed digital image data that are inputted from the image signal processing circuit 116 in the buffer memory 122, and stores the processed digital image data in the memory 120. On the other hand, the memory controller 119 can also output the image data from the buffer memory 122 or the memory 120 to the image signal processing circuit 116. In some cases, the memory 120 may be configured so as to be removable. The memory controller 119 outputs the image stored in the memory 120 via the external interface 121 that can be connected with a computer or the like.

Reference numeral 124 denotes an operating member. The operating member 124 transfers a state of the operating member 124 to the microcomputer 123. The microcomputer 123 controls each part of the image pickup apparatus 100 in accordance with a change of the state of the operating member 124. Reference numeral 125 denotes a switch (a switch SW1), and reference numeral 126 denotes a switch (a switch SW2). The switch SW1 and the switch SW2 are switches that are turned on or off in accordance with an operation of a release button, each of which constitutes one of an input switches of the operating member 124. A state in which only the switch SW1 is turned on is in a half push state of the release button, and an autofocus operation or a photometry operation is performed in this state. A state in which both the switches SW1 and SW2 are turned on is in a full push state of the release button, and an image is taken to be recorded in this state. While the ON state of the switches SW1 and SW2 continues, the continuous shooting is performed. Each switch such as an ISO setting button, an image size setting button, an image quality setting button, or an information display button (not shown) is connected to the operating member 124 so as to detect a state of each switch.

Reference numeral 127 denotes a liquid crystal drive circuit, reference numeral 128 denotes an external liquid crystal display member, and reference numeral 129 denotes a finder liquid crystal display member. The liquid crystal drive circuit 127 drives the external liquid crystal display member 128 and the finder liquid crystal display member 129 in accordance with a display command of the microcomputer 123. The finder liquid crystal display member 129 is provided with a backlight such as an LED (not shown), and this LED is also driven by the liquid crystal drive circuit 127. The microcomputer 123 confirms the capacity of the memory 120 via the memory controller 119 based on predicted value data depending on ISO sensitivity, an image size, and an image quality that are previously set before taking the image, and then calculates the remaining number of images that can be taken. This remaining number of the images that can be taken is displayed on the external liquid crystal display member 128 or the finder liquid crystal display member 129 if needed.

Reference numeral 130 denotes a non-volatile memory (EEPROM). Various kinds of data can be stored in the non-volatile memory 130 even when the power of the image pickup apparatus 100 is off. Reference numeral 131 denotes a power supply unit. The power supply unit 131 supplies a necessary power to each part (ICs or drive systems) of the image pickup apparatus 100.

Embodiment 1

Next, a configuration that performs a focusing method (a method of controlling a focusing apparatus) in Embodiment 1 of the present invention will be described. An image pickup apparatus (a focusing apparatus) of the present embodiment is capable of performing the AF of the phase difference method and the contrast method on the image pickup element 112 (an image pickup surface). However, the present embodiment is not limited to this, and other configuration can also be applied if it is an image pickup apparatus which is capable of performing the AF of the phase difference method and the contrast method.

Figure 2A:
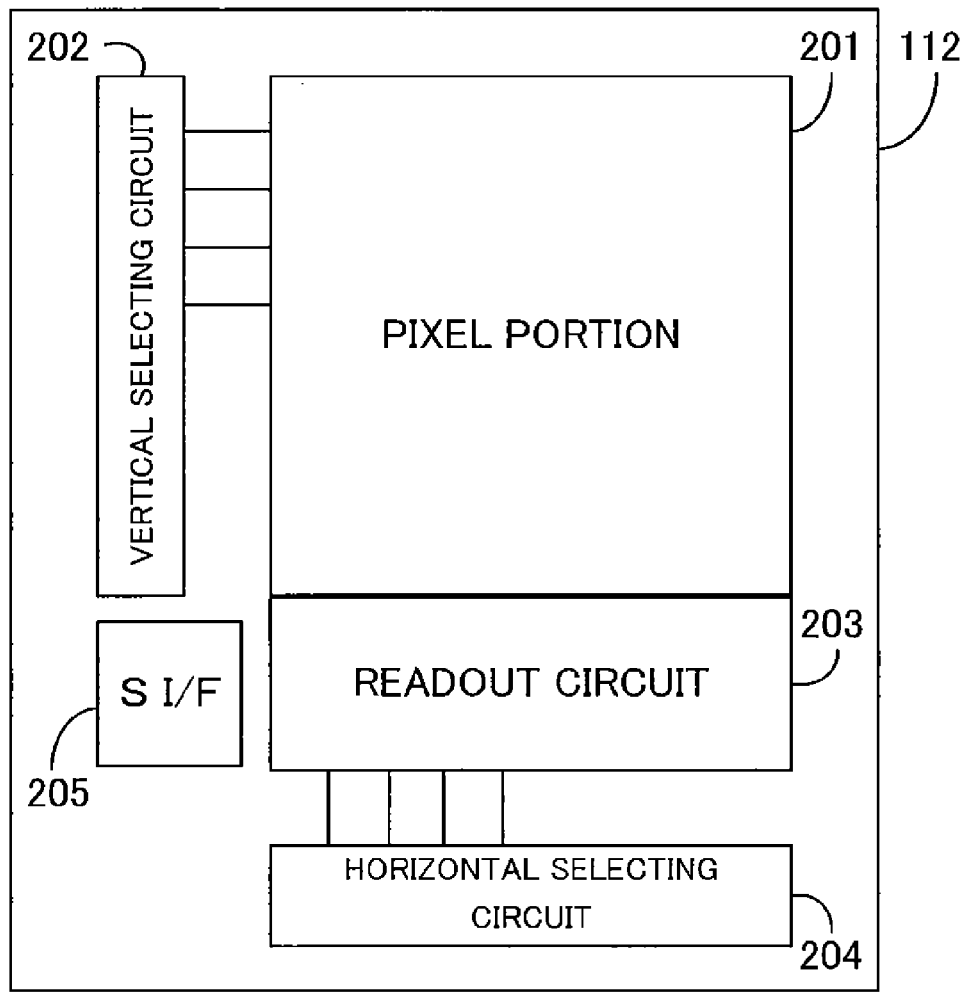
FIGS. 2A and 2B are schematic diagrams of an image pickup element in Embodiment 1.
Figure 2B:
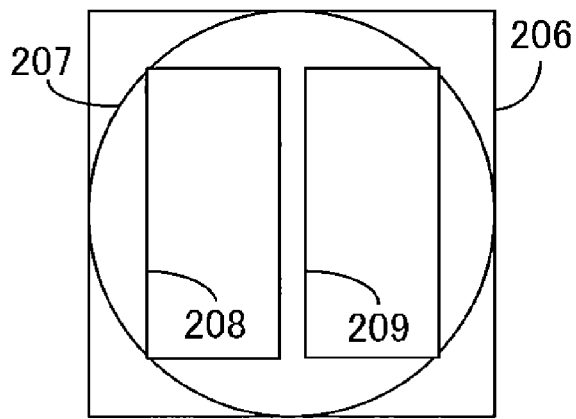

FIGS. 2A and 2B are schematic diagrams of the image pickup element 112 in the present embodiment. FIG. 2A illustrates an overall schematic diagram of the image pickup element 112, and FIG. 2B illustrates a schematic diagram of one pixel of the image pickup element 112. In FIG. 2A, the image pickup element 112 includes a pixel portion 201 that has a plurality of pixels arrayed vertically and horizontally (in two dimensions), a vertical selecting circuit 202 that selects a row of the pixel portion 201, and a horizontal selecting circuit 204 that selects a column of the pixel portion 201. Furthermore, the image pickup element 112 includes a readout circuit 203 that reads a signal of a pixel selected out of the pixels of the pixel portion 201 by the vertical selecting circuit 202, and a serial interface 205 (SI/F) that obtains information such as an operation mode of each circuit determined by an external device. The readout circuit 203 includes a memory that accumulates signals (charges), a gain amplifier, an AD converter, and the like, for each column. The image pickup element 112, in addition to the configuration elements illustrated in FIG. 2A, includes for example a timing generator that supplies a timing to the vertical selecting circuit 202, the horizontal selecting circuit 204, the readout circuit 203, or the like, or a control circuit. The vertical selecting circuit 202 sequentially selects pixel signals of the plurality of rows of the pixel portion 201 to be read by the readout circuit 203. The horizontal selecting circuit 204 sequentially selects the plurality of pixel signals read by the readout signal 203.

In FIG. 2B, reference numeral 206 denotes one pixel in the pixel portion 201. The one pixel 206 includes one microlens 207. The one pixel 206 also includes two photodiodes (PDs 208 and 209) in order to perform the focusing (AF) of the phase difference method on the image pickup surface. The one pixel 206, in addition to the configuration elements illustrated in FIG. 2B, includes for example a pixel amplifier that is used to read a signal of the photodiode (PD) to the readout circuit 203, a selecting switch that selects the row, a reset switch that resets the signal of the photodiode.

Figure 3:
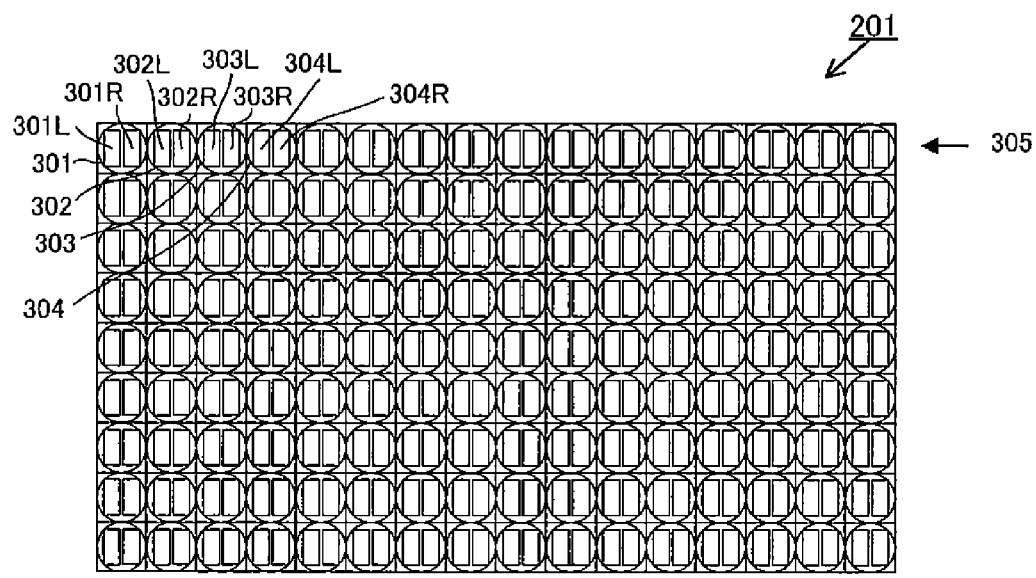
FIG. 3 is a schematic diagram of a pixel portion of the image pickup element in Embodiment 1.

FIG. 3 is a schematic diagram of the pixel portion 201 in the image pickup element 112. In order to provide a two-dimensional image, the pixel portion 201 is configured so that a plurality of pixels illustrated in FIG. 2B are arrayed vertically and horizontally. Each of reference numerals 301, 302, 303, and 304 denotes one pixel. Each of reference numerals 301L, 302L, 303L, and 304L denotes the photodiode (the PD 208) illustrated in FIG. 2B, and each of reference numerals 301R, 302R, 303R, and 304R denotes the photodiode (the PD 209) illustrated in FIG. 2B.

Figure 4:
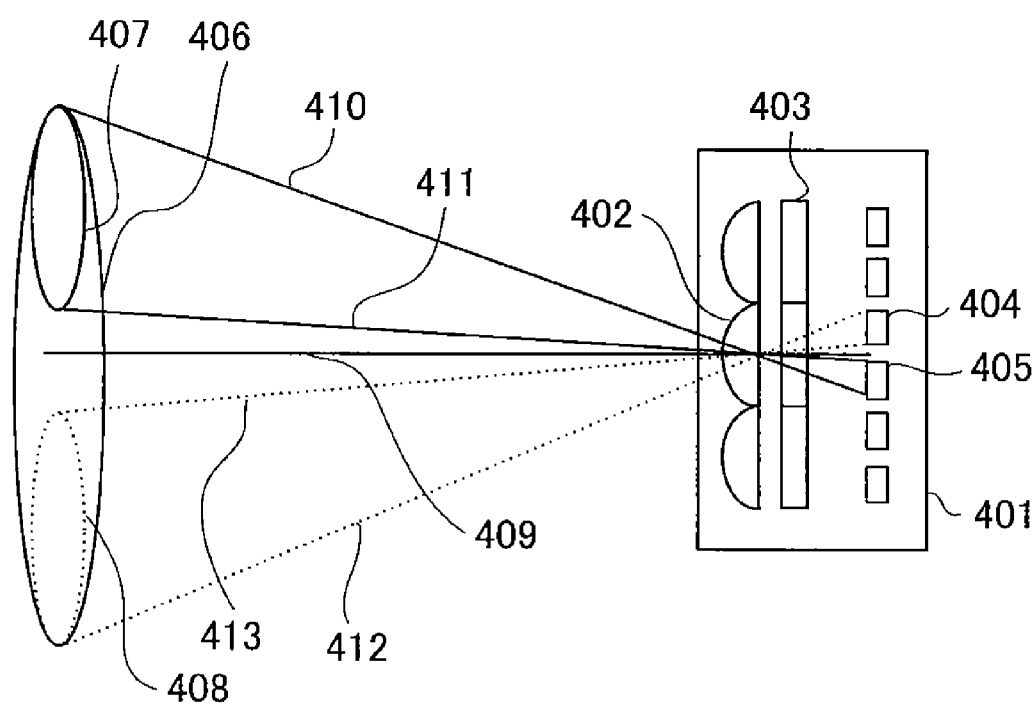
FIG. 4 is a conceptual diagram of illustrating a situation where a light beam emitted from an exit pupil of an image pickup lens enters the image pickup element in Embodiment 1.

Next, referring to FIG. 4, a situation of receiving light on the image pickup element 112 that includes the plurality of pixels illustrated in FIG. 3 will be described. FIG. 4 is a conceptual diagram of illustrating the situation where a light beam emitted from an exit pupil of the image pickup lens 101 enters the image pickup element 112, which schematically describes a focusing method (a method of controlling a focusing apparatus) by the phase difference method. Reference numeral 401 denotes an image pickup element (a cross section of the image pickup element 112). Reference numeral 402 denotes a microlens (the microlens 207 in FIG. 2B), and reference numeral 403 denotes a color filter. Reference numerals 404 and 405 are photodiodes (PDs), which correspond to the PD 208 and the PD 209 in FIG. 2B, respectively. Reference numeral 406 denotes an exit pupil of the image pickup lens 101.

In the present embodiment, with respect to the pixel having the microlens 402, a center of the light beam emitted from the exit pupil 406 is denoted by an optical axis 409. The light beam emitted from the exit pupil 406 enters the image pickup element 401 around the optical axis 409 as a center. Reference numerals 407 and 408 denote partial regions of the exit pupil 406 of the image pickup lens 101. Reference numerals 410 and 411 denote outermost rays of the light beams passing through the partial region 407 of the exit pupil 406. Reference numerals 412 and 413 are outermost rays of the light beams passing through the partial region 408 of the exit pupil 406. As illustrated in FIG. 4, in the light beams emitted from the exit pupil 406, the light beam at the upper side with respect to the optical axis 409 as a boundary enters the PD 405, and on the other hand, the light at the lower side with respect to the optical axis 409 enters the PD 404. In other words, the PD 404 and the PD 405 receive light beams of different regions of the exit pupil 406.

In FIG. 2B and FIG. 4, the two photodiodes (PDs) are provided with respect to one microlens 207 (the microlens 402), but the present embodiment is not limited to this. For example, the phase difference detection can be performed using a configuration where a PD at one side is used for a certain pixel and a PD at the other side is used for an adjacent pixel. In other words, in the image pickup surface of the image pickup element 401, the AF by the phase difference method on the image pickup surface can be performed if images of different regions of the exit pupil 406 of the image pickup lens 101 are obtained.

The image pickup element 112 is configured so that A-line pixels and B-line pixels that receive light beams from exit pupils different from each other in the image pickup lens 101 are arrayed vertically and horizontally. Referring to FIG. 3, the A-line pixels are configured by the pixels of the PDs 301L, 302L, 303L, and 304L and the B-line pixels are configured by the pixels of the PDs 301R, 302R, 303R, and 304R of the pixels 301, 302, 303, and 304 of the row 305. With respect to the outputs of the A-line pixel and the B-line pixel, an interval between two images (an image interval) is different in accordance with whether a focus state is an in-focus state, a front focus state, or a rear focus state. The focus lens of the image pickup lens 101 is moved so that this image interval is changed to be an interval in the in-focus state so as to perform the focusing. In other words, a moving amount of the focus lens can be calculated based on a shift amount of the two images (the image shift amount). In the present embodiment, for convenience, the two image (the image of the A-line pixel and the image of the B-line pixel) are described by using the array of adjacent pixels, but actually, it is preferred that the two images be obtained by pixels having the same color filter.

Thus, the image pickup element 112 performs a photoelectric conversion for the image that is formed by the light beams passing through different pupil regions of the image pickup lens 101 (an image pickup optical system) so as to generate a pair of image signals. Then, the microcomputer 123 (a detector) detects the focus state based on the phase difference (the image shift amount) of the pair of image signals generated by the image pickup element 112. The processings up to driving the image pickup lens 101 based on the detected image shift amount is performed by using a known method, and therefore the detailed descriptions relating to the processings is omitted.

Next, a method of performing the AF processing by the contrast method using the image pickup element 112 in the present embodiment will be described. The image pickup element 112 is provided with the two photodiodes (PDs) with respect to one microlens. In other words, the image pickup element 112 includes a plurality of unit cells having a first pixel and a second pixel that correspond to the same microlens. Therefore, any one of the signals of the two PDs is continuously read to calculate the evaluation value based on the contrast value. Then, the focus lens of the image pickup lens 101 is moved so as to obtain a peak of the evaluation value to perform the focusing. In the AF processing by the contrast method of the present embodiment, only one of output values of the two PDs is used, but similarly to a case of a shot image, an evaluation value based on an image that is obtained by combining the outputs of the two PDs may also be used.

Next, referring to FIGS. 5A to 5D, the control of the microcomputer 123 that performs the focusing method of the present embodiment will be described. As described above, the microcomputer 123 functions as the detector (a focus detector) and the exposure controller. In addition, the microcomputer 123 functions as a determining unit that determines whether the exposure value is set to be fixed or variable by the exposure controller in accordance with an operation of the detector. FIGS. 5A to 5D are diagrams of describing an AF ranging frame (a focus detection frame) in a case where the focusing is performed for a moving object only by using the AF of the phase difference method.

In FIGS. 5A to 5D, reference numeral 501 denotes a field of view that is covered by the image pickup element 112, i.e. an image pickup region. Reference numeral 502 denotes an AF ranging frame in the phase difference method. Reference numeral 503 denotes an object (a moving vehicle). As illustrated in FIG. 3, the image pickup element 112 of the present embodiment is constituted by a plurality of pixels that have the same structure on a whole of its surface. Therefore, the AF by the phase difference method can be performed for whole of the image pickup region 501. Accordingly, the AF ranging frame 502 that freely catches the object can be set. In the present embodiment, a case where one AF ranging frame 502 is set and the AF ranging frame 502 is movable will be described.

Figure 5A:
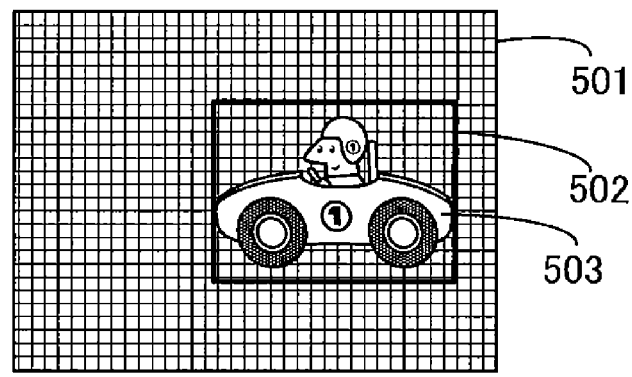
FIGS. 5A to 5D are diagrams of describing an AF ranging frame (a focus detection frame) when focusing for a moving object is performed only using an AF of a phase difference method in Embodiment 1.
Figure 5B:
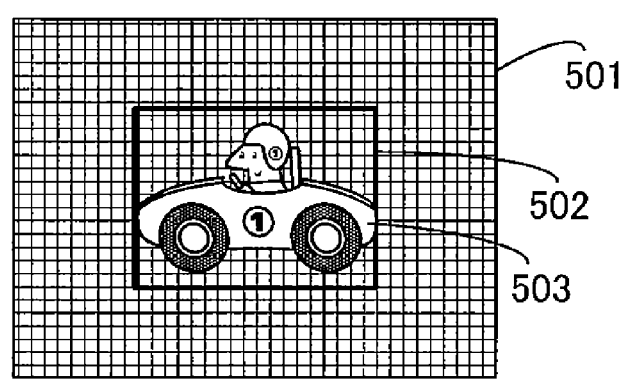
Figure 5C:
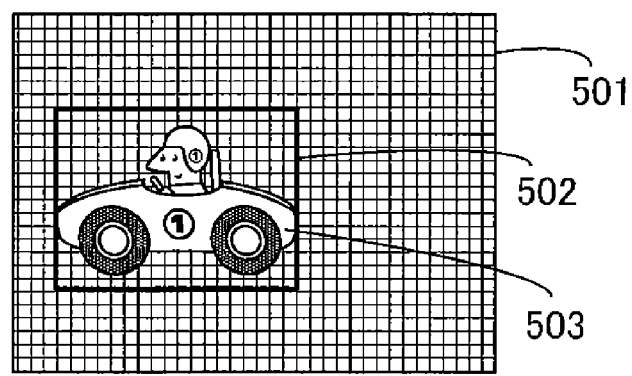
Figure 5D:
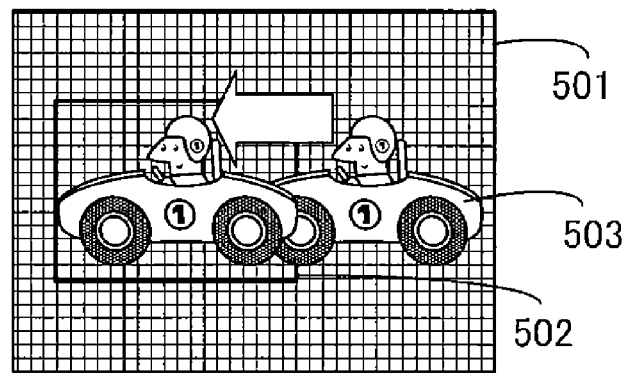

As illustrated in FIGS. 5A to 5C, in accordance with the movement of the object 503 from right to left, a position of the AF ranging frame 502 (a focus detection region) is also changed (moved). In this case, in order to improve a detection accuracy of the AF by the phase difference method, it is preferred that an AE control (an automatic exposure control) for the image pickup operation in performing the AF by the phase difference method be appropriately performed in accordance with the change of the position of the AF ranging frame 502. In FIG. 5D, a case where the AF ranging frame 502 is fixed and the moving object 503 comes into the AF ranging frame 502 is illustrated. In this case, similarly, it is preferred that the AE control for the image pickup operation in performing the AF by the phase difference method be appropriately performed.

The present embodiment is assumed to perform the focusing, first of all, only by the AF of the phase difference method, but is not limited to this. In accordance with an image pickup condition when the object is caught by the AF ranging frame at the first time, whether the focusing is performed only by using the AF of the phase difference method or the focusing is performed by combining the phase difference method and the contrast method may also be determined. As illustrated in FIGS. 5A to 5D, when the contrast is comparatively high or the object is moving, it is preferred that the focusing be performed by the AF of the phase difference method.

Figure 6:
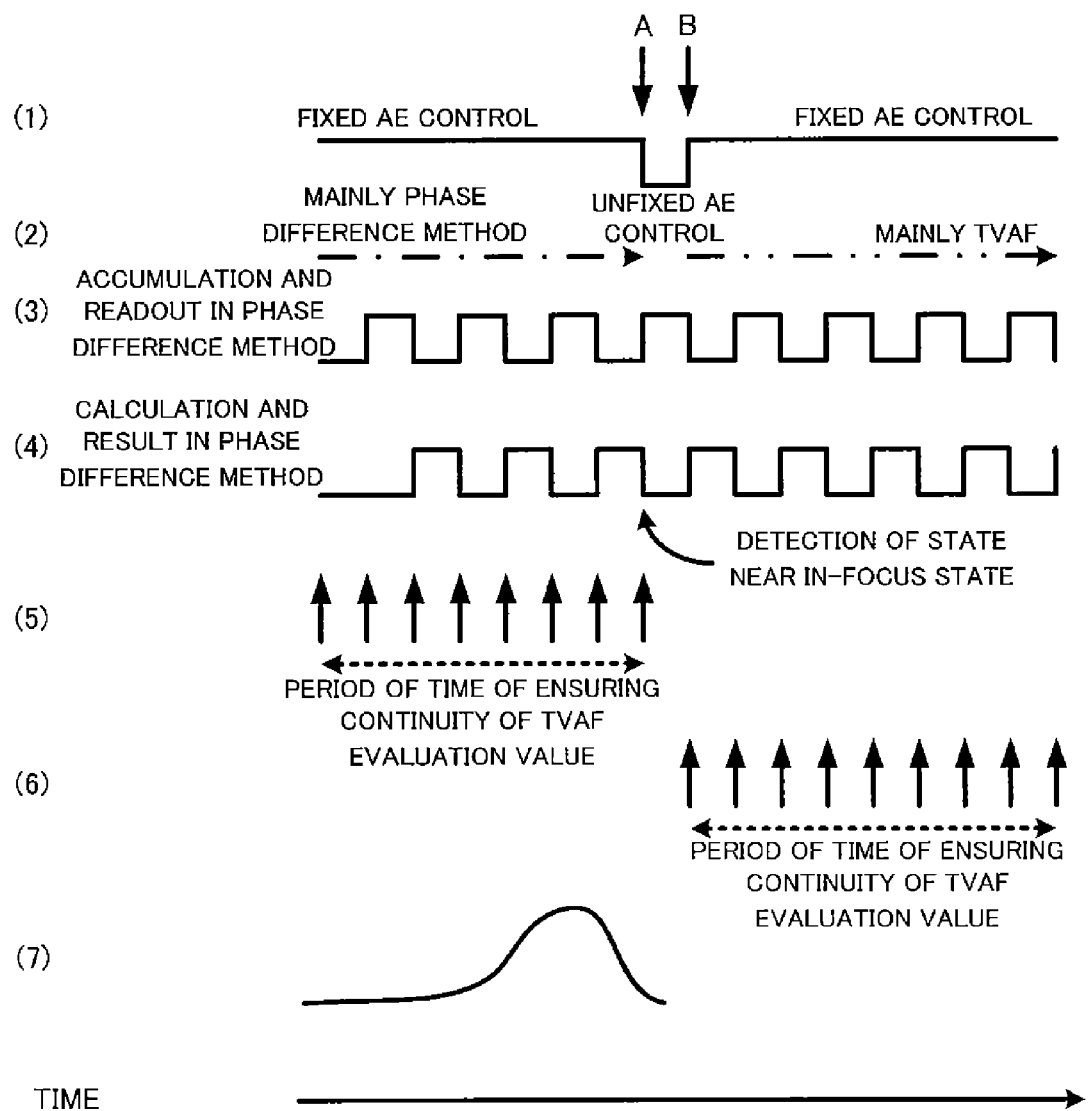
FIG. 6 is a diagram of describing a focusing method (a method of controlling a focusing apparatus) when the phase difference method and a contrast method are combined in Embodiment 1.

Subsequently, referring to FIG. 6, the focusing method of combining the phase difference method and the contrast method will be described. FIG. 6 is a diagram of describing the combination control of the AE control that is changed between the fixed and unfixed control (an appropriate control) and the two AF controls of the phase difference method and the contrast method. In particular, it corresponds to a case where the focusing only by the AF of the phase difference method is difficult based on the image pickup condition when first of all the object is caught in the AF ranging frame (a case of a low contrast). In FIG. 6, a lateral axis indicates a time, which illustrates a case where the time proceeds from left to right. With respect to the early part of the focusing, the control is performed up to the vicinity of the in-focus state mainly by the AF of the phase difference method, and with respect to the latter part, the in-focus control is performed mainly by the AF of the contrast method (TVAF).

Reference numeral (1) in FIG. 6 denotes a state of the AE control for the image pickup operation during the AF control. The AE control is fixed from the start time of the focusing to a time A and after a time B. This is because the continuity of the evaluation value by the contrast method to be combined needs to be ensured (guaranteed). On the other hand, during the period from the time A to the time B, the AE control is unfixed. This is because the AE control value is updated to that for the contrast method that has a main control up to an in-focus position after the time B.

Reference numeral (2) in FIG. 6 illustrates which of the two AF control methods is mainly performed. As described above, the AF control of the phase difference method is mainly performed up to a state near the in-focus state in the early part of the AF control, and the AF control of the contrast method is mainly performed up to the in-focus state in the latter part of the AF control. Reference numerals (3) and (4) in FIG. 6 schematically illustrate a time period of accumulation and readout of an image pickup signal (an electric charge) in the AF of the phase difference method, and a time period of a calculation of the image pickup signal and notifying operation of the result in the AF of the phase difference method, respectively. The upper-level time period corresponds to each of the operation time periods, which alternately appears. In the present embodiment, at the time A, it is assumed that the focus state is near the in-focus state.

Reference numerals (5) and (6) in FIG. 6 illustrate obtaining timings of the evaluation values by the AF of the contrast method. With respect to the evaluation value by the AF of the contrast method, the readout and the calculation (the evaluation) are performed in synchronization with a supplying timing of a finder image to the EVF monitor 118 that is a view finder. Therefore, compared to the phase difference method, as illustrated in (7) in FIG. 6, smoother evaluation history can be obtained. Accordingly, also at the stage at which the phase difference method is mainly performed, higher accuracy determination whether or not the focus state is near the in-focus state can be performed by detecting peak of the evaluation value of the contrast method. At the stage (time A) at which the focus state is determined to be near the in-focus state, the AE control value is updated to be used for the contrast method by which the control is performed up to the in-focus position, and the AE control value is fixed from the time B to the time at which the in-focus state is obtained.

Figure 7:
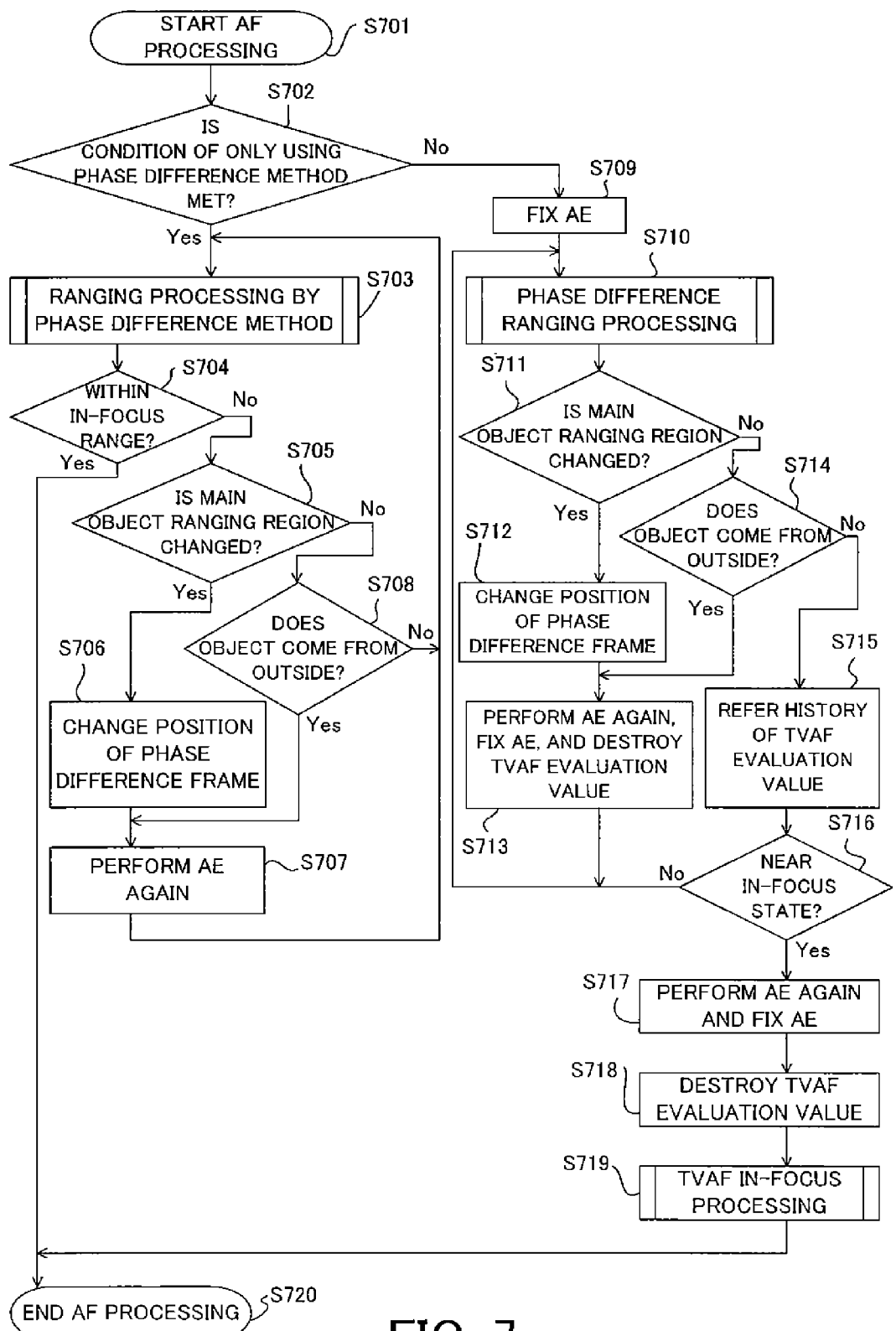
FIG. 7 is a flowchart of the method of controlling the image pickup apparatus in Embodiment 1.

Next, referring to FIG. 7, a method of controlling the image pickup apparatus 100 (a focusing method) in the present embodiment will be described. FIG. 7 is a flowchart of illustrating the method of controlling the image pickup apparatus 100. FIG. 7 illustrates a case where whether the AE (the exposure value) during the focusing (the AF control) is fixed or unfixed (variable) is determined in accordance with whether the focusing is performed by combining the phase difference method and the contrast method (TVAF). Each step in FIG. 7 is performed based on an instruction of the microcomputer 123.

First of all, in Step S701, the AF processing is started, in Step S702, whether or not the AF operation in this time is performed only by the phase difference method, i.e. whether or not an in-focus condition in which the AF operation is performed only by the phase difference method is met is determined. The AF processing only by the phase difference method is performed when it is determined that the control up to the in-focus region can be performed only by the phase difference method. The phase difference method is, commonly, a method of estimating a relative shift amount of an image obtained by a pupil division (an image shift amount) so as to estimate a shift degree of the focus, which is not limited to the case where the image pickup surface of the present embodiment is used. Therefore, when the image shift amount cannot be exactly detected, an accurate AF control cannot be performed. In obtaining the image shift amount, a change amount of an area formed with a maximum value or a minimum value while two images are relatively shifted needs to be obtained. Therefore, when the shapes of the two images are not substantially coincident with each other, an exact result cannot be obtained. The degree of the coincidence of the shapes of the two images, i.e. whether the degree of the coincidence is high or low, is one of references of determining whether or not the AF processing can be performed only by the phase difference method.

There are a variety of factors that cause the degree of the coincidence of the two images, and for example, the influence such as generation of an optical ghost or a crosstalk by the saturation of the adjacent pixel of the image pickup element exists. Furthermore, when a detection region is distant from the optical axis of the image pickup optical system, i.e. an image height is high, the degree of the coincidence is deteriorated since vignetting is optically generated and asymmetric influences are received between the two images. Also, in a state where the aperture stop is closed during the control, i.e. in a small aperture state, a coefficient of estimating the shift degree of the focus from the relative shift amount between the two images is too great, and as a result, the accuracy is deteriorated and it is difficult to control up to the in-focus region only by using the phase difference method.

In Step S702, when it is determined that the condition of performing the AF only by using the phase difference method is met, in Step S703, a ranging processing (a focus detection processing) by the phase difference method is performed. Then, in Step S704, it is determined whether or not a ranging processing result in Step S703 is in an in-focus range. When this result is not in the in-focus range, the flow proceeds to Step S705, it is determined whether a ranging region (a focus detection region) that is a main object (an object) is changed. When the ranging region that is the main object is changed, the flow proceeds to Step S706, a position of the AF ranging frame (the focus detection range) by the phase difference method is changed. Then, in Step S707, in order to improve an accuracy of the phase difference detection by the phase difference method, the AE for the image signal is performed again so as to obtain a new (an appropriate) exposure value. Then, returning to Step S703, the processing of Step S703 is repeated until it is determined that the ranging processing result is in the in-focus range in Step S704. Thus, when the determining unit determines that the focus state is in an out-of-focus state and that the focus detection region is changed, the exposure controller controls the exposure value to be variable.

On the other hand, in Step S705, when it is determined that the AF ranging frame (the focus detection region) does not change, the flow proceeds to Step S708, and it is determined whether the main object comes from the outside of a ranging field of view into the AF ranging frame. When it is determined that the main object comes from the outside of the ranging field of view, the flow proceeds to Step S707, and again the AE is performed for the image signal in order to improve the detection accuracy by the phase difference method. In other words, when the determining unit determines that the focus state is in the out-of-focus state and that the main object comes into the focus detection region, the exposure controller controls the exposure value (the AE control value) to be variable. On the other hand, in Step S708, when it is not determined that the main object comes into the focus detection region, the exposure controller maintains (fixes) the exposure value and then the flow proceeds to the processing of Step S703.

In Step S702, when it is determined that the condition of performing the AF only by the phase difference method is not met, instead of performing the AF only by the phase difference method, the AF control is performed by combining the phase difference method and the contrast method (TVAF). In other words, the detector detects the focus state based on the phase difference of the image signal and then detects the focus state based on the contrast of the image signal.

In this case, the flow proceeds to Step S709, the exposure controller fixes the exposure value. This is because the evaluation value by the contrast method needs to be calculated in addition to the control by the phase difference method up to the state near the in-focus state and the history also needs to be obtained when it is determined that the control only by the phase difference method cannot be performed up to the in-focus range. As described above, in the contrast method on the image pickup surface, the AF evaluation value is significantly affected by the output of the image pickup signal, and furthermore the continuity of the history needs to be considered. Therefore, the AE control value needs to be fixed. Using this history, whether or not the control result by the phase difference method is a correct region near the in-focus state is determined in Step S716 later.

Subsequently, in Step S710, the ranging processing by the phase difference method is performed. In the present embodiment, when the two focus detection methods are combined as described above, the phase difference method that has a short drive control time of the focus lens is used up to the state near the in-focus state, and the higher accuracy contrast method is used to perform the focus determination after the state near the in-focus state.

Similarly to Step S705, in Step S711, it is determined whether or not the focus detection region that is the main object is changed. When the focus detection region is changed, the flow proceeds to Step S712 and the position of the AF ranging frame (the focus detection region) by the phase difference method is changed. Then, in Step S713, in order to improve the detection accuracy by the phase difference method, the AE processing of the image pickup signal is performed again. In other words, when the determining unit determines that the focus detection region is changed in determining the focus state based on the phase difference, the exposure controller controls the exposure value to be variable. In this case, the exposure value is temporarily fixed so as to prepare the AF by the contrast method and again the AE processing is performed, and therefore the continuity of the AF evaluation value by the contrast method is cut off. Accordingly, the TVAF evaluation value is temporarily destroyed. Then, returning to Step S710, the focus detection processing is performed by the phase difference method.

On the other hand, in Step S711, when it is determined that the ranging region is not changed, the flow proceeds to Step S714 and it is determined whether or not the main object comes from the outside of the ranging field of view into the AF ranging frame (the focus detection region). When it is determined that the main object comes from the outside of the ranging field of view in Step S714, in Step S713, in order to improve the detection accuracy by the phase difference method, the AE processing of the image pickup signal is performed again. Thus, when the determining unit determines that the object comes into the focus detection region in detecting the focus state based on the phase difference, the exposure controller controls the exposure value to be variable (changed). Then, the changed exposure value is fixed and the TVAF evaluation value by the contrast method is temporarily destroyed.

On the other hand, in Step S714, when it is not determined that the main object comes from the outside of the ranging field of view, the main object is considered to be caught and the history of the evaluation value by the contrast method that is stored during the control by the phase difference method described above is referred in Step S715. Then, in Step S716, it is determined whether or not the state is near the in-focus state. When it is not determined that the state is near the in-focus state in Step S716, the flow returns to Step S710 again and the ranging processing is performed by the phase difference method.

On the other hand, when it is determined that the state is near the in-focus state in Step S716, the flow proceeds to Step S717, and a final AE processing (another AE) is performed in order to perform a final control to obtain the in-focus state, and the AE control value (the exposure value) is fixed. Subsequently, in Step S718, the history of the evaluation value by the contrast method (the TVAF evaluation value) is destroyed. Then, in Step S719, a control to obtain the in-focus determination is performed by using the contrast method. In other words, when the determining unit determines that the focus state detected based on the phase difference is in the state near the in-focus state, the exposure controller controls the exposure value to be variable and then the changed exposure value is fixed. Then, the detector detects the focus state based on the contrast of the image signal in the state where the changed exposure value is fixed.

According to the present embodiment, when the focusing is performed by the phase difference method, the exposure value can be appropriately controlled to be fixed or variable in accordance with the operation of the detector (the control situation) such as the movement of the focus detection region, the intrusion of the object into the focus detection region, or the switch of the phase difference method to the contrast method. The operation of the detector (the focus detector) is not limited to the operation specifically described in the present embodiment.

Embodiment 2

Figure 8:
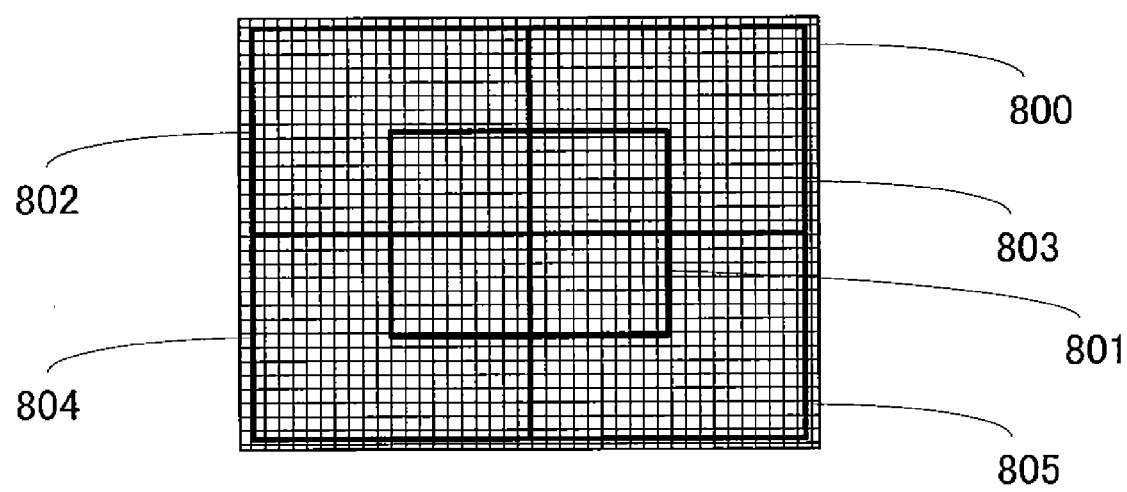
FIG. 8 is a diagram of describing a multipoint ranging frame using a phase difference detection method of an image pickup apparatus in Embodiment 2.

Next, referring to FIG. 8, an image pickup apparatus in Embodiment 2 of the present invention will be described. FIG. 8 is a diagram of describing a multipoint ranging frame by the phase difference detection method.

In FIG. 8, reference numeral 800, similarly to the image pickup region 501 of FIGS. 5A to 5D, denotes a field of view that is covered by the image pickup element 112, i.e. the image pickup region. In FIGS. 5A to 5D, the AF ranging frame 502 that catches the object can be freely set, but the AF ranging frame is not limited to one frame. In the present embodiment, as illustrated in FIG. 8, a case where five image pickup regions (a plurality of focus detection regions) of image pickup regions 801 (center), 802 (upper left), 803 (upper right), 804 (lower left), and 805 (lower right) will be described.

The image pickup regions 801 to 805 are multipoint ranging frames (a plurality of focus detection regions) having the same size each other. In order to treat them in the same way, the charge accumulation and readout is performed while switching each focus detection region, and during the calculation to compare the result, the AE control for the image pickup operation needs to be fixed. This is because there is a difference of times that are required for the AF operations of the contrast method and the phase difference method.

As described above, considering the drive control of the focus lens as well, the AF operation time of the phase difference method is shorter. However, specifically, when limiting to the time from the readout of the image signal of the image pickup element using the calculation (the evaluation) to the result of the calculation (the evaluation), it is not necessarily met. In the AF by the contrast method, in synchronization with the supplying timing of the finder image to the EVF monitor 118 that is a view finder, the readout of the pixel signal up to the calculation (the evaluation) can be performed. On the other hand, with respect to the phase difference method, due to a difference of the use pixel number, it may be difficult to read all the image pickup signals of the plurality of regions in the same time period by the limitation of hardware in many cases. For example, as illustrated in FIG. 2B, it is because signals to be treated are at least doubled when the pixel configuration having the two PDs 208 and 209 is adopted.

As described above, the phase difference method is commonly a method of obtaining the relative shift amount of the two images obtained by the pupil division to estimate the degree of coincidence of the focus. Therefore, when the shift amount of the two images cannot be exactly detected, an exact AF control cannot be performed. In order to obtain the shift amount of the two images, signals of the two images need to be separately obtained, and therefore it takes about twice as long to obtain the shift amount even if it is the same pixel region as that in the contrast method. A method of reading the pixels to separately obtain actual signals is different depending on a method of forming the signal of the image pickup element, but this point is the same.

For example, when the image signal of each of the PD 208 and the PD 209 illustrated in FIG. 2B is referred to as an A image and a B image, there is a method of separately reading the A image and the B image or a method of separately reading (A+B) and one of A and B and then calculating (A+B)−A=B or (A+B)−B=A. The latter exactly obtains an intrinsic image pickup result of (A+B), which is a direct form as a method of reading a common image pickup signal. Nevertheless, twice reading is needed. Accordingly, even when only the phase difference method is used, in an operation state in which the plurality of AF ranging frames are set, the AE control needs to be fixed until the readouts of all the image pickup signals needed for the AF operation in at least a plurality of set regions are completed.

Thus, in the present embodiment, the focus detector detects the focus state based on the phase difference in the plurality of focus detection regions. When the determining unit determines that the detections of the focus states in the plurality of focus detection regions are not completed, the exposure controller fixes the exposure value. According to the present embodiment, the exposure value can be switched to be fixed or variable in accordance with whether or not the detections of the focus states in all the focus detection regions are completed when the focusing is performed by the phase difference method in the plurality of focus detection regions.

Embodiment 3

Figure 9A:
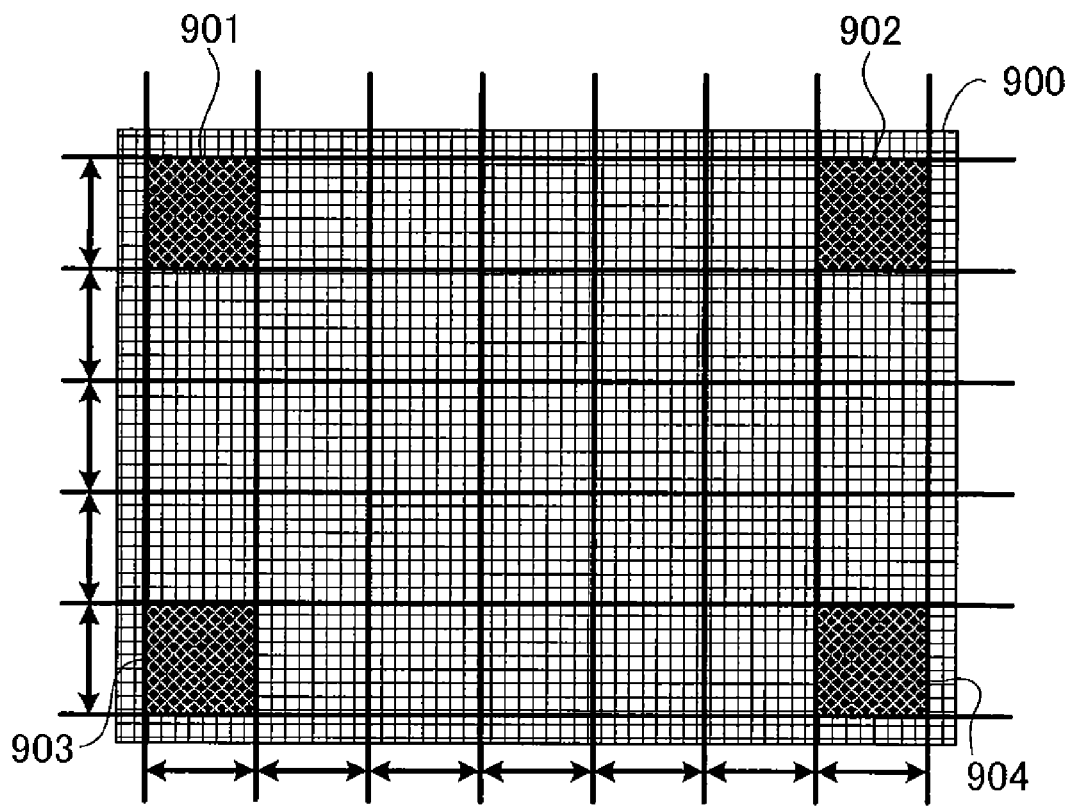
FIGS. 9A and 9B are diagrams of describing a multipoint ranging frame using a phase difference detection method of an image pickup apparatus in Embodiment 3.
Figure 9B:
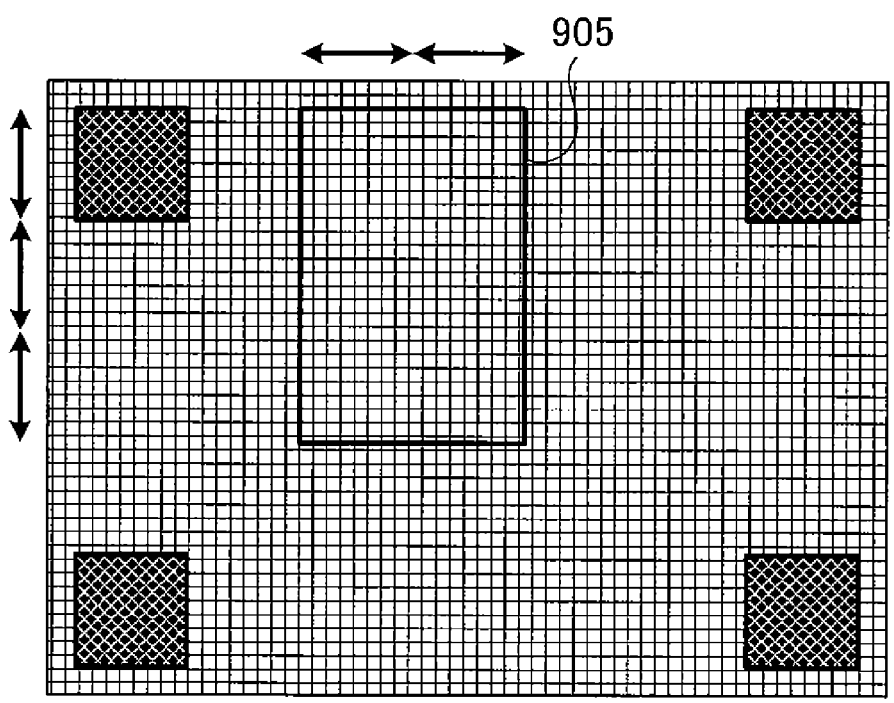

Subsequently, referring to FIGS. 9A and 9B, an image pickup apparatus in Embodiment 3 of the present invention will be described. FIGS. 9A and 9B are diagrams of describing multipoint ranging frames by a phase difference detection method of the image pickup apparatus in the present embodiment, which illustrates a case where more ranging frames (multipoint ranging frames) by the phase difference detection method are provided. In FIG. 9A, reference numeral 900, similarly to the image pickup region 501 in FIGS. 5A to 5D, denotes a field of view that is covered by the image pickup element 112, i.e. an image pickup region. In the present embodiment, as illustrated in FIG. 9A, almost the whole of the image pickup region except the outermost region is segmentalized into 35 divisional regions that are constituted by 7 columns vertically×5 rows horizontally. Then, 31 regions expect 4 regions at four corners (image pickup regions 901 to 904) are set to be the ranging frames by the phase difference detection method. Each region is also a ranging frame which is originally set to be used for the contrast method. Reference numeral 905 in FIG. 9B denotes a frame that has a size of 2 columns vertically×3 rows horizontally (hereinafter, referred to as "2×3"). This is a range where image signals by which the ranging can be performed by the phase difference detection method can be read at a time to be processed. In other words, while the region (the focus detection region) of this size is sequentially switched to complete the readout for all of 31 regions, the AE control for the image pickup operation needs to be fixed.

Figure 10A:
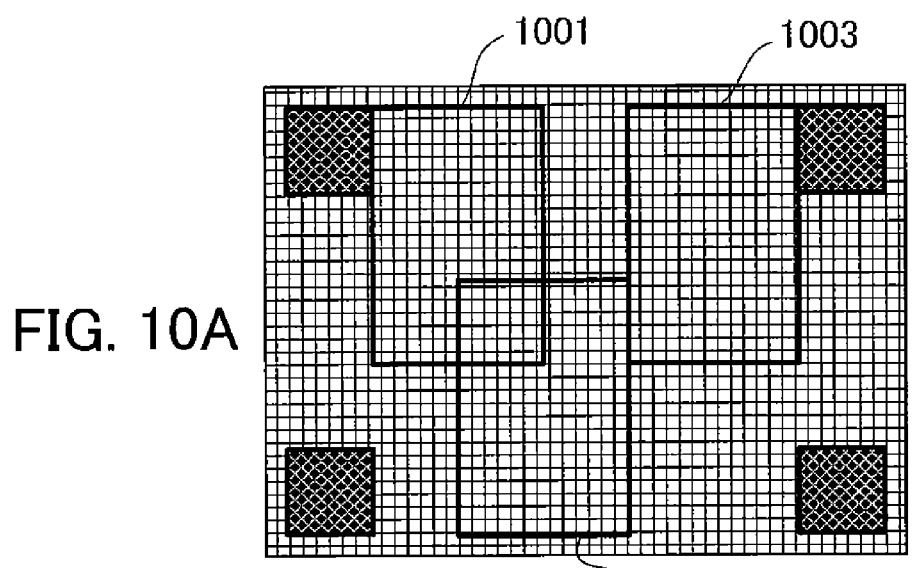
FIGS. 10A to 10C are diagrams of describing the multipoint ranging frame using the phase difference detection method of the image pickup apparatus in Embodiment 3.
Figure 10B:
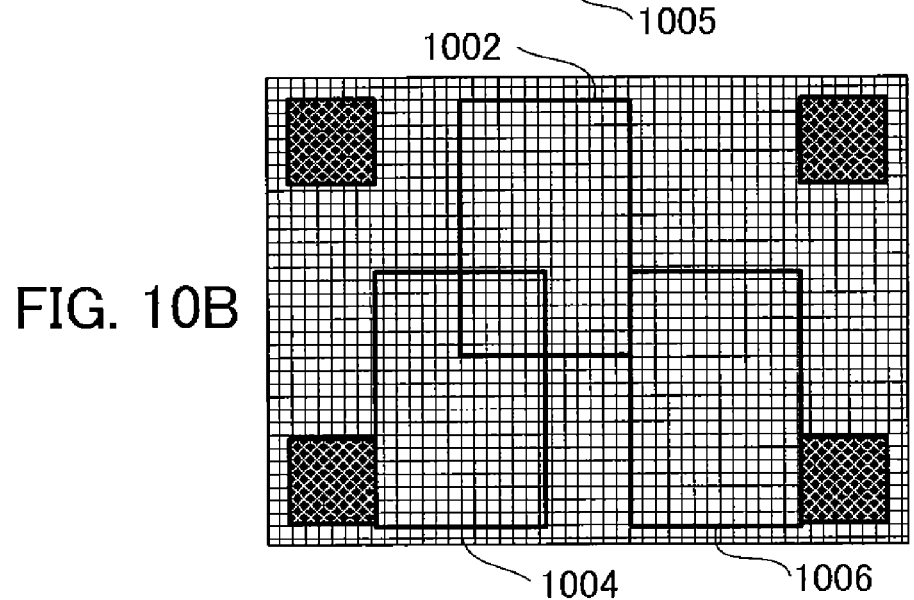
Figure 10C:
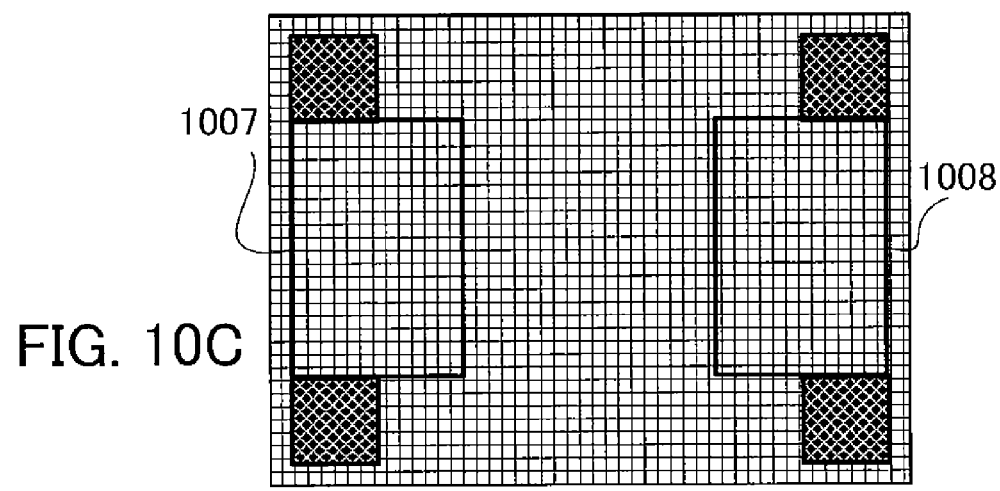

FIGS. 10A to 10C are diagrams of describing a multipoint ranging frame by the phase difference detection method of an image pickup apparatus in the present embodiment, which illustrate a setting of frame regions in which the frame 905 having the size of 2×3 is sequentially switched to be read for all the 31 divisional regions. In FIGS. 10A to 10C, frames 1001 to 1008 that are equivalent to the frame 905 are illustrated. For easy understanding of an overlap state of the region having the size of 2×3, the illustration is divided into FIGS. 10A to 10C, but the frames 1001 to 1008 are set in this order. In other words, while electric accumulations and readout operations are performed a total of eight times, the AE control for the image pickup operation is fixed.

Figure 11A:
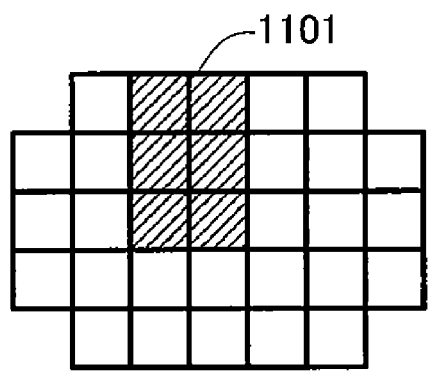
FIGS. 11A to 11H are transition diagrams of describing a position of the multipoint ranging frame using the phase difference detection method of the image pickup apparatus in Embodiment 3.
Figure 11B:
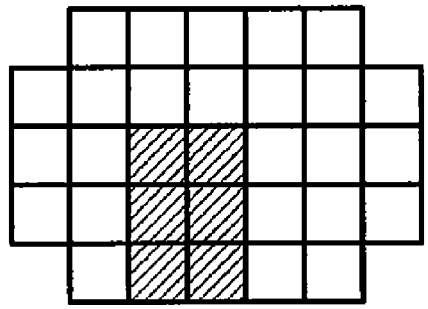
Figure 11C:
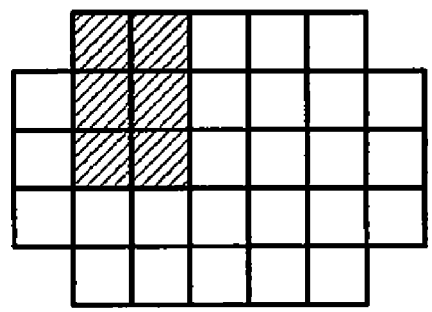
Figure 11D:
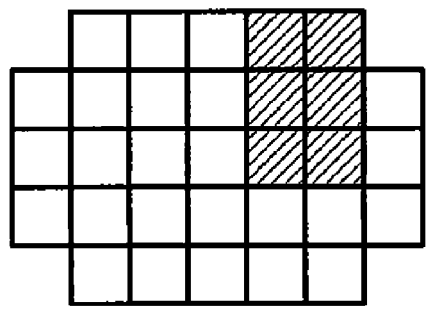
Figure 11E:
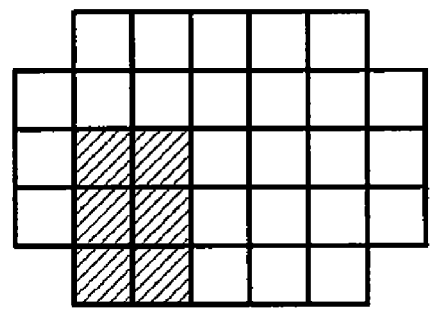
Figure 11F:
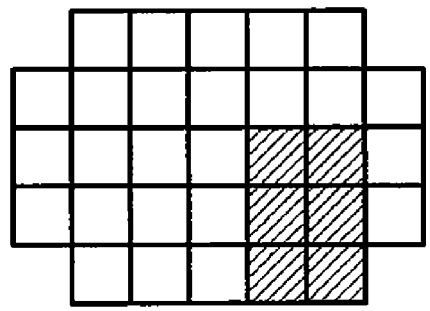
Figure 11G:
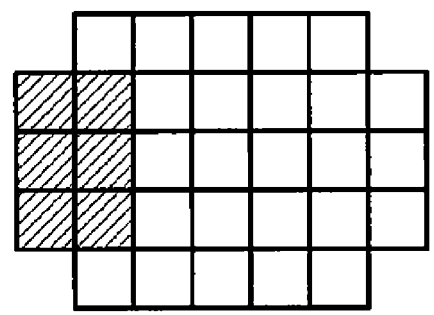
Figure 11H:
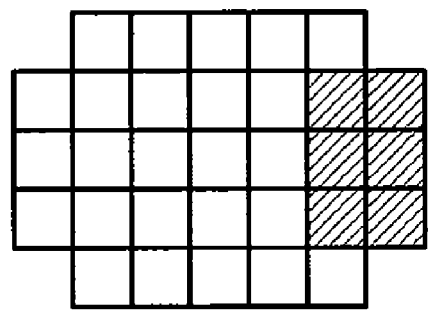

FIGS. 11A to 11H are transition diagrams of describing a position of the multipoint ranging frame by the phase difference detection method of the image pickup apparatus in the present embodiment, which illustrate a transition state where the frame having the size of 2×3 is switched a total of eight times. A frame 1101 (shaded portion) in FIG. 11A is equivalent to the frame 905 having the size of 2×3 in FIG. 9B, and as illustrated in FIGS. 11A to 11H, the positions of the frame are sequentially switched eight times. However, this is one example and many combinations can be considered.

Figure 12A:
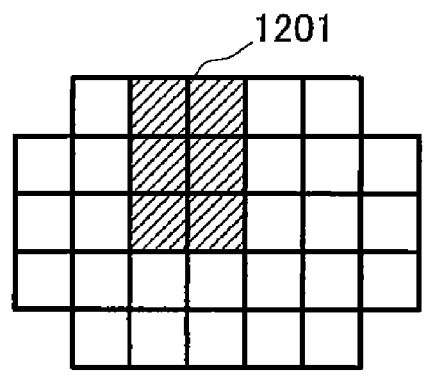
FIGS. 12A to 12H are diagrams of describing overlapped regions caused by the transition of the position of the multipoint ranging frame using the phase difference detection method of the image pickup apparatus in Embodiment 3.
Figure 12B:
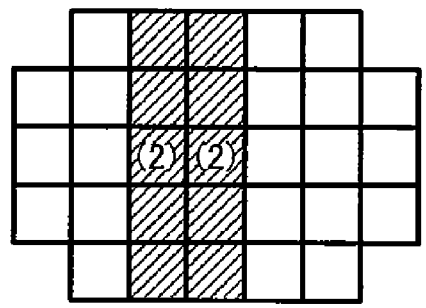
Figure 12C:
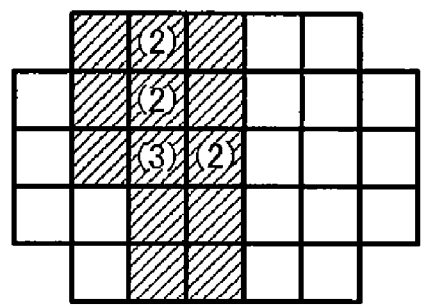
Figure 12D:
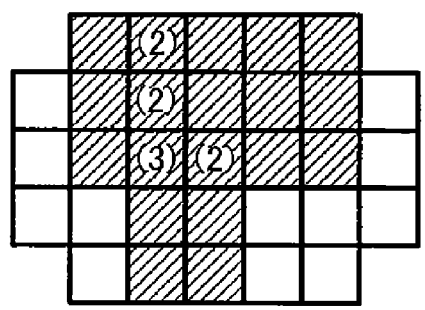
Figure 12E:
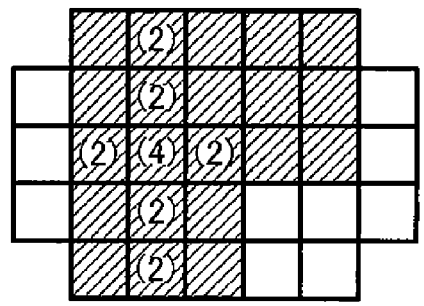
Figure 12F:
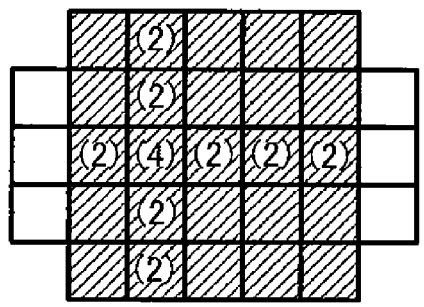
Figure 12G:
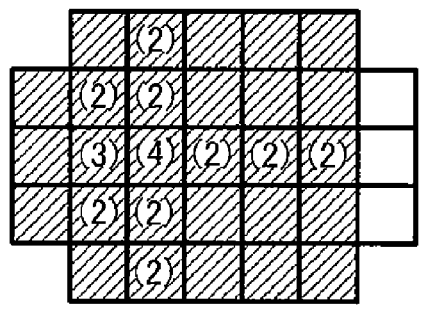
Figure 12H:
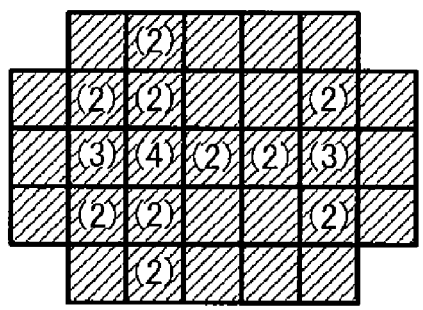

FIGS. 12A to 12H are diagrams of describing an overlapped region by the transition of the position of the multipoint ranging frame by the phase difference detection method of the image pickup apparatus in the present embodiment, which illustrate which region of the 31 divisional regions is overlapped to be read by the frame having the size of 2×3 that is switched eight times in FIGS. 11A to 11H. A frame 1201 (a shaded portion) in FIG. 12A is equivalent to the frame 1101 in FIG. 11A. In FIGS. 12A to 12H, with respect to the history of FIGS. 11A to 11C, the overlap number of times is also indicated. In FIGS. 12B to 12H, reference numeral "(2)" means that it is read a total of twice, and reference numeral "(3)" means that it is read a total of three times. As a result, one region is read four times.

Figure 13:
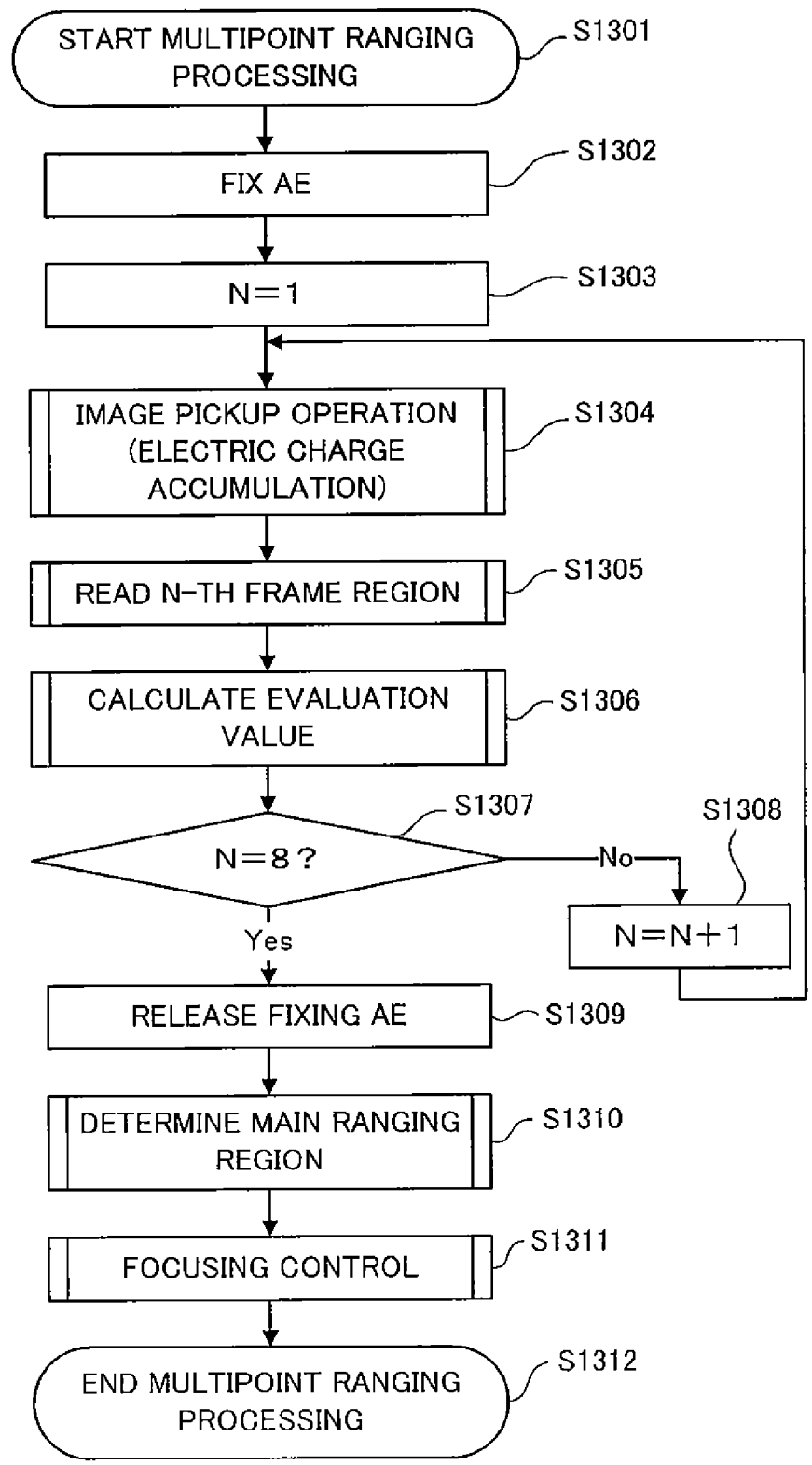
FIG. 13 is a flowchart of a method of controlling a multipoint ranging using the phase difference detection method of the image pickup apparatus in Embodiment 3.

Next, in the present embodiment, the accumulation and the readout of the electric charge for the 31 divisional regions and a multipoint ranging processing based on the calculation of the evaluation value by the phase difference method will be described. FIG. 13 is a flowchart of a method of controlling the multipoint ranging by the phase difference detection method of the image pickup apparatus in the present embodiment, which illustrates the multipoint ranging processing by the phase difference method for all the 31 divisional regions (Step S1301). When a user performs an operation that instructs the focus detection (for example, when the switch SW1 is pushed), this processing is performed. In the embodiment, in order to perform the multipoint ranging, the image pickup operation (the electric charge accumulation) is performed a total of eight times while the AE control is fixed, and the charges for the frame having the size of 2×3 are collectively read. Each step in FIG. 13 is mainly performed by the microcomputer 123 (the detector) or the image signal processing circuit 116.

First of all, in Step S1302, the microcomputer 123 fixes the AE to be the exposure value that is set based on the output from the image pickup element 112. In other words, the microcomputer 123 sets the exposure value based on the signal of the image pickup element 112 that is obtained before the electric charge accumulation for the focus detection, and fixes the AE to be the exposure value while the focus detection is performed.

Subsequently, in Step S1303, a control variable N is initialized (N=1). The control variable N is a variable of controlling the eight image pickup operations (the electric charge accumulations), which represents the number of times and also indicates that the frames 1001 to 1008 each having the size of 2×3 in FIGS. 10A to 10C are regions that are to be read.

Next, in Step S1304, the image pickup operation (the electric charge accumulation) is performed by using the fixed AE. Subsequently, in Step S1305, the N-th frame region having the size of 2×3 is read in accordance with the control variable N. In this case, in the present embodiment, a signal of the A-line pixels in the N-th frame, and a signal that is obtained by combining the signal of the A-line pixels and a signal of the B-line pixels in the whole of the screen are read. A common image pickup signal can be obtained by the signal that is obtained by combining the signal of the A-line pixels and the signal of the B-line pixels. A signal of the B-line pixels in the N-th frame can be obtained by the difference of both the signals corresponding to the N-th frame.

Then, in Step S1306, the image shift amount (the evaluation value) that is a phase difference amount of six regions included in the N-th frame is calculated. The image shift amount (the evaluation value) is calculated by the image signal processing circuit 116 in FIG. 1. In other words, after the readout operation of the accumulation signal is performed, the processing of Step S1306 is performed. Accordingly, the evaluation value that is used to the focus detection or the focusing for all the 31 divisional regions is calculated for each region where the readout operation is finished. Also with regard to the overlapped region in the readout operation described with reference to FIGS. 12A to 12H, the evaluation values are redundantly obtained. These evaluation values are sequentially sent to the microcomputer 123 (the detector) and comprehensively determined so as to perform the focus detection operation.

Next, in Step S1307, the value of the control variable N is determined. When N=8 is not met (when the control variable N is less than 8), the flow proceeds to Step S1308 in which the control variable N is set to be N+1, and returns to Step S1304. In other words, the image pickup operation (the electric charge accumulation), the readout, and the calculation of the evaluation value are performed the total of eight times up to N=8.

On the other hand, when the control variable N is equal to 8 in Step S1307, it is determined that the image pickup operation (the electric charge accumulation), the readout, and the calculation of the evaluation value are finished a predetermined number of times. Then, the flow proceeds to Step S1309, and the fixing of the AE performed in Step S1302 is released. Subsequently, in Step S1310, the evaluation value in each region obtained up to now is comprehensively determined by the microcomputer 123 (the detector) in FIG. 1, and a main ranging region (a main focus detection region) is determined. This point is similar to conventional multipoint phase difference AF which is performed by using a surface other than the image pickup surface, and a near point priority is a main determination reference. Then, in Step S1311, the focusing control is performed based on the image shift amount that is the evaluation result in the determined ranging region, and in Step S1312, the multipoint ranging processing of the present embodiment if finished.

Thus, in the present embodiment, the microcomputer 123 (the detector) detects a phase difference of an image signal of a first pixel groups and an image signal of a second pixel groups that correspond to the focus detection region. The microcomputer 123 also detects a phase difference of an image signal that is generated by sequentially switching a plurality of focus detection regions. Then, the microcomputer 123 (the exposure controller) controls an exposure value to be fixed until the detections of the phase differences in the plurality of focus detection regions are completed by the detector. It is preferred that the detector sequentially detects the phase differences in the plurality of focus detection regions. It is also preferred that the plurality of focus detection regions include a region in which parts of the focus detection regions are overlapped with each other.

In the image pickup apparatus of the present embodiment, a plurality of focus detection modes containing the multi-point ranging processing may also be included. For example, the focus detection mode is a mode that determines an appropriate ranging region by performing the multipoint ranging to perform the focus control or a mode that performs the focus control at a ranging point selected by a user via an operating member, a touch panel, or the like. In this case, when the mode that performs the multipoint ranging is selected by the user, the multipoint ranging processing in FIG. 13 of the present embodiment is performed.

Embodiment 4

Next, referring to FIGS. 14A to 14H, an image pickup apparatus in Embodiment 4 of the present invention will be described. In the embodiment described above, the multipoint ranging processing in the basic field of view that covers the image pickup element 112, i.e. in the image pickup region is described. By the way, it is preferred that the setting of the frame region having the size of 2×3 be set optimally in accordance with a condition.

FIGS. 14A to 14H are transition diagrams of a position of the multipoint ranging frame by the phase difference detection method of the image pickup apparatus in the present embodiment. FIGS. 14A to 14D illustrate an example in which an image pickup operation in a wide aspect is set. Reference numeral 1400 in FIG. 14A denotes an image pickup region that has a horizontally long (a wide) setting of 7 columns vertically×3 rows horizontally, which is an example of the image pickup region that is adopted for a movie. Reference numeral 1401 in FIG. 14A denotes a frame having the size of 2×3 (the frame region). In this case, the whole of the image pickup region 1400 can be covered by a total of four image pickup operations (electric charge accumulation), and the AE is fixed during the four image pickup operations. In the present embodiment, only one vertical column at the center is overlapped.

Figure 14A:
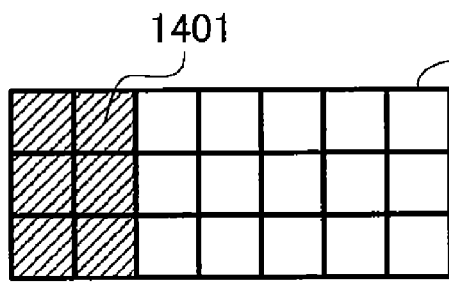
FIGS. 14A to 14H are transition diagrams of describing a position of a multipoint ranging frame using a phase difference detection method of an image pickup apparatus in Embodiment 4.
Figure 14B:
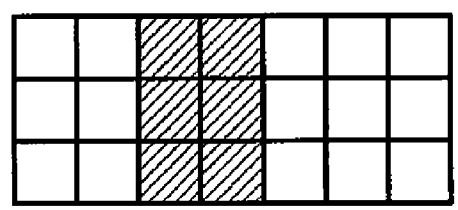
Figure 14C:
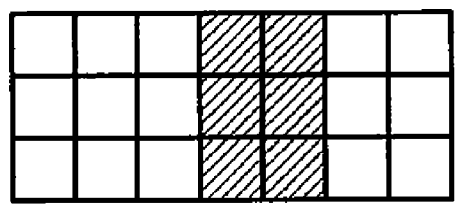
Figure 14D:
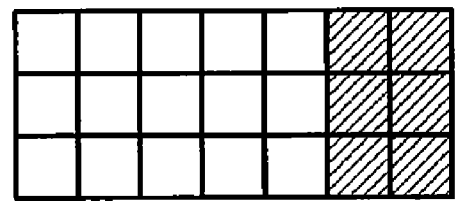
Figure 14E:
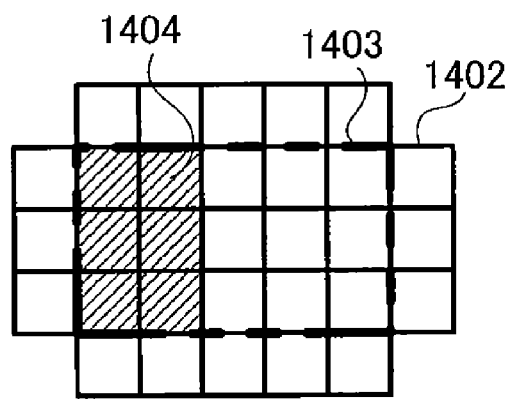
Figure 14F:
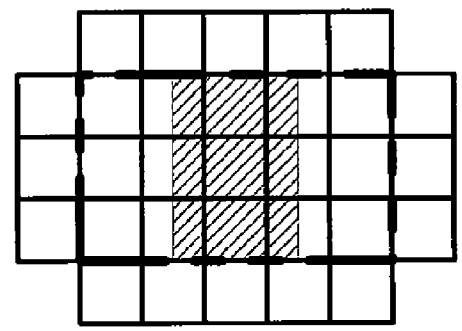
Figure 14G:
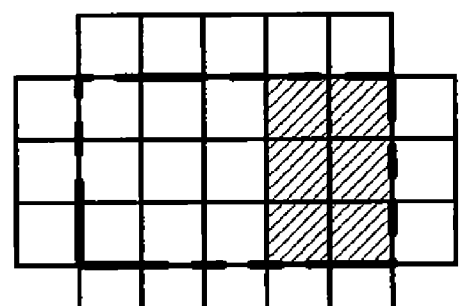
Figure 14H:
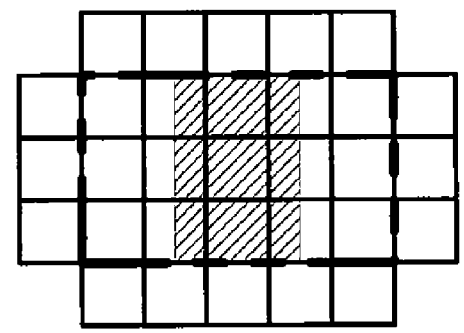

FIGS. 14A to 14H illustrate an image pickup region 1402 that is obtained by using the image pickup element 112 similar to that in Embodiment 3, which is a setting example of the frame region having the size of 2×3 especially when the focus state is in a large blur state. Since the focus state is in the large blur state, any objects need to be early caught. Therefore, in addition, 15 regions (a region 1403) of 5 columns vertically×3 rows horizontally at the center portion out of the 31 basic regions are specifically focused. Furthermore, all the subject regions (the region 1403) can be covered by three image pickup operations (electrical charge accumulations), but only a region of 1 column vertically×3 rows horizontally at the center portion in FIGS. 14F and 14H are specifically focused, and this region is set to be a detection target once out of twice. Since the focus state is in the large blur state, it is considered that the detection is performed in a region closer to the center region. Also in the configuration of the present embodiment, the AE is fixed during the total of four image pickup operations (the electric charge accumulations).

According to each of the embodiments described above, a focusing apparatus and a method of controlling the focusing apparatus that switches an exposure value to be fixed or variable in accordance with a condition when performing a focusing by a phase difference method can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2012-061006, filed on Mar. 16, 2012, and Japanese Patent Application No. 2013-020847, filed on Feb. 5, 2013, which are hereby incorporated by reference herein in their entirety.

What is claimed is:

1. A focus detection apparatus comprising:
   an image pickup element configured to generate a pair of image signals for focus detection by phase difference detection method, wherein a plurality of focus detection regions are provided in a region on the image pickup element;
   a detector configured to sequentially perform the focus detection for each focus detection region using the pair of image signals corresponding to each focus detection region; and
   an exposure controller configured to control an exposure value,
   wherein the detector performs the focus detection based on a phase difference of the pair of image signals generated by sequentially switching the plurality of focus detection regions, and
   wherein the exposure controller fixes the exposure value, in response to an operation that instructs the focus detection, while the detector performs the focus detection for the plurality of focus detection regions.

2. The focus detection apparatus according to claim 1, wherein the plurality of focus detection regions are overlapped with each other.

3. A method of controlling a focus detection apparatus having an image pickup element configured to generate a pair of image signals for focus detection by phase difference detection method, wherein a plurality of focus detection regions are provided in a region on the image pickup element, the method comprising:
   a detecting step of sequentially performing the focus detection for each focus detection region using the pair of image signals corresponding to each focus detection region; and
   an exposure controlling step of controlling an exposure value,
   wherein, in the detecting step, the focus detection is performed based on a phase difference of the pair of image signals generated by sequentially switching the plurality of focus detection regions, and
   wherein, in the exposure controlling step, the exposure value is fixed, in response to an operation that instructs the focus detection, while the focus detection is performed for the plurality of focus detection regions.

4. The focus detection apparatus according to claim 1, wherein the image pickup element includes a plurality of unit cells, each of the unit cells includes a pair of photodiodes.

5. The focus detection apparatus according to claim 1, wherein the image pickup element is configured to generate an image signal for a shot image.

6. The focus detection apparatus according to claim 1 further comprising:
   a focus controller configured to perform a focus control based on a detection result of the detector.

7. The focus detection apparatus according to claim 6 further comprising:
   a determination unit configured to determine a main focus detection region from the plurality of focus detection regions for the focus control by the focus controller.

8. The focus detection apparatus according to claim 1, wherein the exposure controller controls the exposure value based on an image signal, the image signal being a signal generated by the image pickup element before the pair of image signals are generated.

* * * * *